M. MARCUCCI.
POCKET CLIP.
APPLICATION FILED APR. 7, 1911.

1,016,166.

Patented Jan. 30, 1912.

Witnesses:
Geo. Kratz
Sully Rousso

Inventor
Marius Marcucci
By his Attorneys
Emery, Booth, Janney & Varney

UNITED STATES PATENT OFFICE.

MARIUS MARCUCCI, OF NEW YORK, N. Y., ASSIGNOR TO MODERN PEN COMPANY, OF NEW YORK, N. Y., A CORPORATION OF WEST VIRGINIA.

POCKET-CLIP.

1,016,166.

Specification of Letters Patent.

Patented Jan. 30, 1912.

Application filed April 7, 1911. Serial No. 619,457.

*To all whom it may concern:*

Be it known that I, MARIUS MARCUCCI, a subject of the King of Italy, and a resident of the city of New York, in the county and State of New York, have invented certain new and useful Improvements in Pocket-Clips, of which the following is a specification, reference being had to the accompanying drawings, forming a part hereof.

The object of the invention is to provide a clip for a fountain pen, or other device commonly carried in the pocket, which shall be simple to manufacture and which shall be particularly easy and convenient to apply or attach to the pen or other device in connection with which it is to be used.

Figure 1:
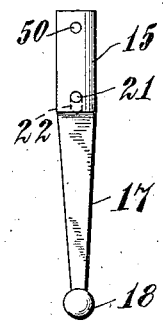
Figure 2:
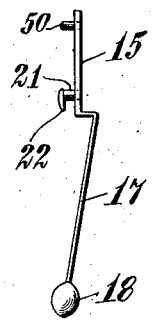
Figure 3:
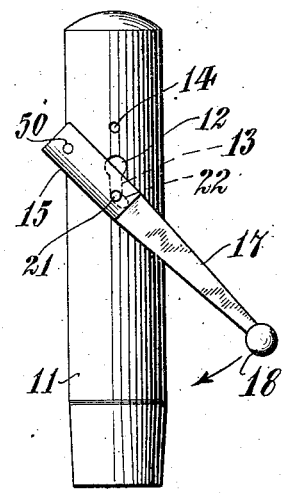
Figure 4:
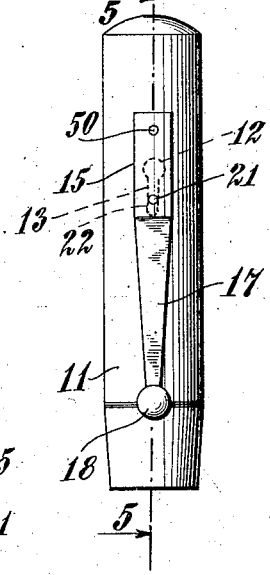
Figure 5:
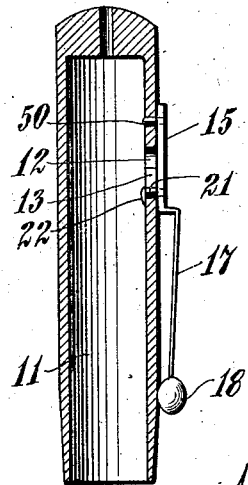

In the drawings where one practical embodiment is shown, Figure 1 is a view in elevation of the same, Fig. 2 is a similar view looking in a direction at right angles to the first, Fig. 3 is a similar view showing the clip being applied or attached to the cap of a fountain pen, Fig. 4 is a similar view showing the clip fastened in position, and, Fig. 5 is a sectional view, the plane of section being indicated by the line 5—5 in Fig. 4.

The form of the body of the improved clip is quite immaterial to the present invention, being shown in the drawings, for purposes of explanation and illustration, as having a curved plate or base 15 and a tapered arm or clip proper 17 terminating in a knob 18.

The attaching means, which forms the subject matter of the invention, consists of a pin, having a head 22 and a shank 21, and adapted to be inserted into an opening 12 in the cap 11 and to be slid along a groove or slot 13 leading from the opening 12; and some other means of engagement between the cap and clip which, as the clip is turned upon the pin 21 (Fig. 3), may be automatically snapped or sprung into place to hold the clip from further movement in the groove and thus positively secure it to the cap. These latter means may be, and preferably are, constituted by a plain pin 50 mounted upon the clip by the side of the headed pin 21 and extending in the same direction, and a second opening 14 in the cap isolated from the opening 12, whereby as the clip is turned, as indicated in Fig. 3, the pin 50 will be brought into register with the opening 12, and owing to the resiliency of the clip, will automatically seat itself in said opening, thus holding the clip from further twisting or sliding in the groove 13. To produce the said resiliency and to hold the pin 50 securely in the opening 12, the arm 17 is made to press tightly against the side of the cap (see Fig. 5).

In its application or attachment to a pen or other device, therefore, the improved clip is exceedingly simple, all that is required being to insert the head of the pin 21 through the opening 12, draw the shank of the pin into the groove 13 and then turn it until the pin 50 slips into the opening 14. It is obvious that where the article to which the clip is to be applied is not hollow, the groove 13 may be simply undercut to form undersides for the head of pin 21 to engage.

I claim as my invention:—

The combination with a pen or the like having an opening and a groove leading therefrom, of a clip having a pin headed so as to pass through said opening and be held in the groove, and means on one side of the headed pin to engage the pen, and a spring member on the other side of the headed pin adapted to bear against the pen, whereby in attaching the clip to the pen, the spring member acts to press said means into engagement automatically with the pen and thereafter to retain said means in engagement with the pen.

This specification signed and witnessed this 31st day of March, A. D. 1911.

MARIUS MARCUCCI.

Signed in the presence of—
JOHN W. THOMPSON,
LUCIUS E. VARNEY.